J. F. HENDRICKSON.
FLUID PRESSURE PACKING FOR STEAM AND OTHER JOINTS.
APPLICATION FILED AUG. 7, 1908.
926,414.
Patented June 29, 1909.
2 SHEETS—SHEET 1.
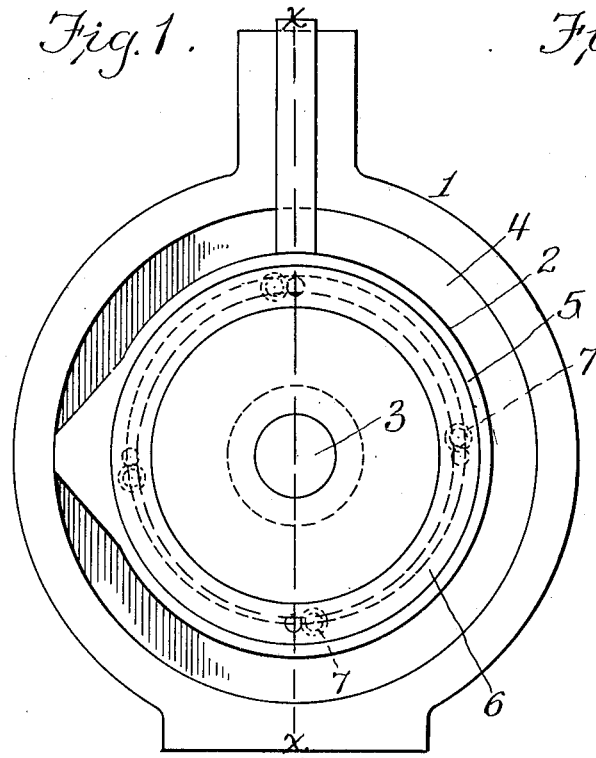
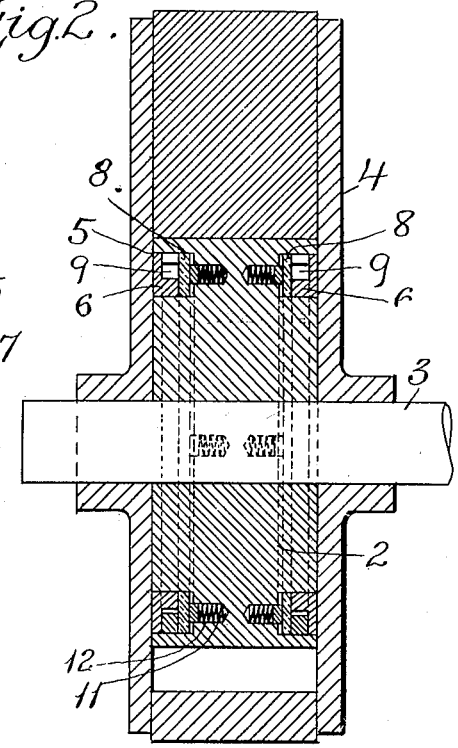
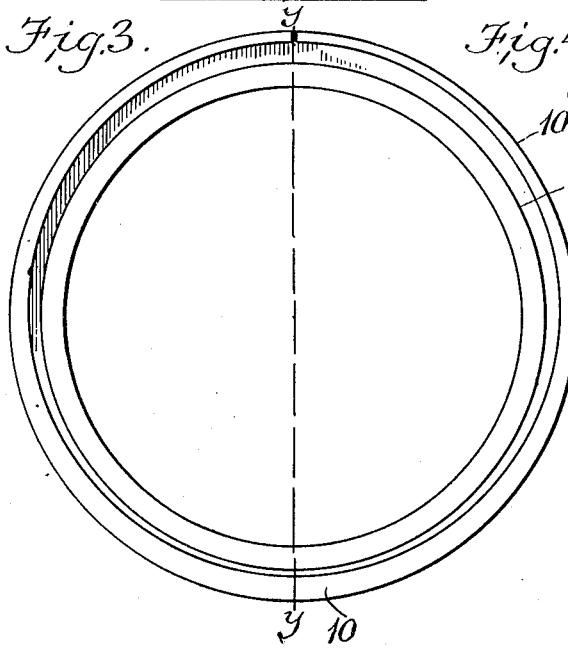
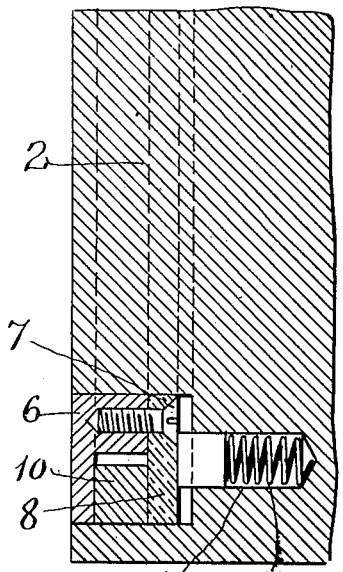
Witnesses:
Inventor:
J. F. Hendrickson J. F. HENDRICKSON.
FLUID PRESSURE PACKING FOR STEAM AND OTHER JOINTS.
APPLICATION FILED AUG. 7, 1908.
926,414.
Patented June 29, 1909.
2 SHEETS—SHEET 2.
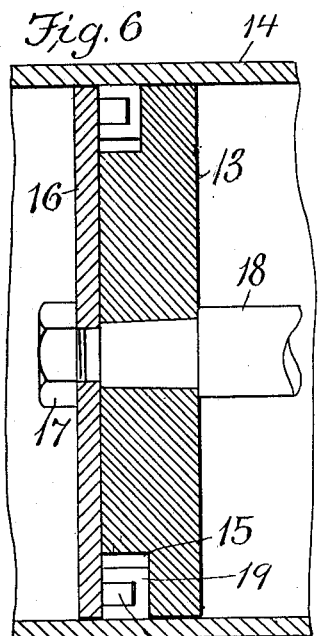
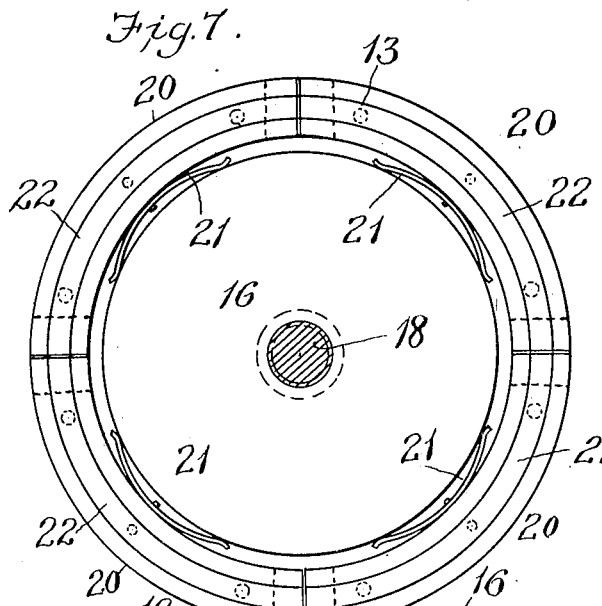
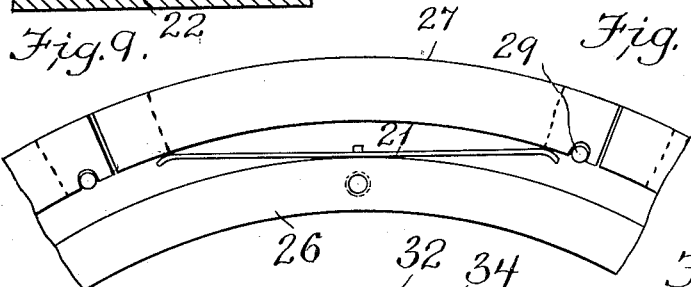
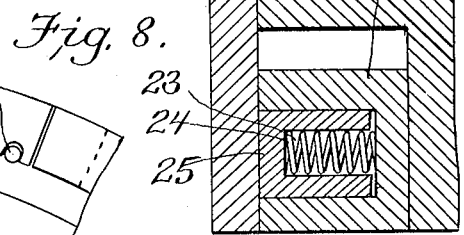
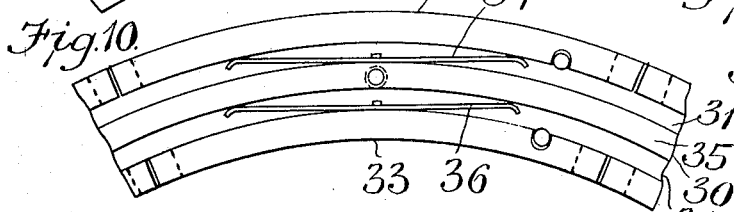
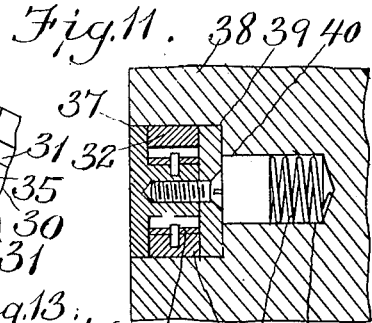
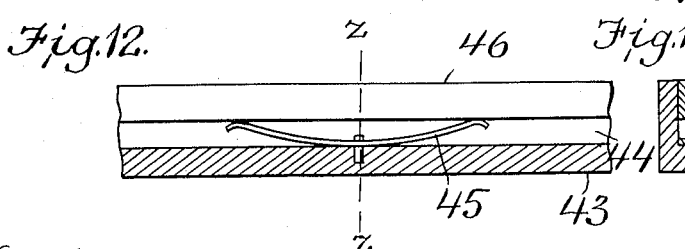
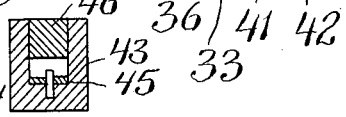
Witnesses:
P. H. Pezzetti
A. E. Rust.
Inventor.
J. F. Hendrickson
by Wright Brown Quinby May
Attys.

UNITED STATES PATENT OFFICE.

JOHN F. HENDRICKSON, OF BOSTON, MASSACHUSETTS, ASSIGNOR TO JOHN EMERY HARRIMAN, JR., OF BROOKLINE, MASSACHUSETTS.

FLUID-PRESSURE PACKING FOR STEAM AND OTHER JOINTS.

No. 926,414.  Specification of Letters Patent.  Patented June 29, 1909.

Application filed August 7, 1908. Serial No. 447,384.

*To all whom it may concern:*

Be it known that I, JOHN F. HENDRICKSON, of Boston, in the county of Suffolk and State of Massachusetts, have invented certain new and useful Improvements in Fluid-Pressure Packings for Steam and other Joints, of which the following is a specification.

This invention relates to packings for steam and fluid pressure joints and has especial reference to packing joints for the pistons of steam engines.

Heretofore various devices have been provided for rendering the steam joints of engines, especially rotary engines, tight to prevent leakage. In such devices, means have been employed to expand the packing in such joints, said packings being located in grooves and adapted to be forced outward from said grooves against the adjacent contacting surface. In such constructions, while a tight joint may be formed between the packing and the part against which it presses, yet, especially in the case of rotary engines, leakage at the side of said packing into the groove is not avoided, in consequence of which, in the case of rotary engines, steam will leak into the groove between the side of the packing and the side of the groove and will follow the groove around in a circumferential direction so as to get past the partition separating the two parts of the cylinder of a rotary engine, thereby creating back pressure of the steam. One of the objects of this invention is to avoid the foregoing. In the case of reciprocating pistons, steam would leak through between the sides of the groove and its packing, but instead of passing around in a circumferential direction, it would pass at once around the packings to the other side of the piston.

The invention has for its object to provide an improved packing joint for steam and fluid pressure engines, and for other purposes, by means of which friction will be diminished and by means of which a tight joint will be provided.

The invention further has for its object to provide an improved packing for steam and fluid pressure joints having yielding frictional members independently movable of each other, and movable in different directions or at different angles to one another.

The invention further has for its object to provide an improved packing for steam and fluid pressure joints composed of a number of packing members mounted one within the other and independently expansible in different directions whereby their several joints will coöperate to provide tight joints, preventing leakage and lessening friction.

In carrying out the invention, the piston of an engine or other member, which is provided with a packing according to this invention, is formed with a groove having its open side or sides abutting against an adjacent frictional surface. Within this groove is mounted a grooved packing formed with a groove of any suitable shape, said packing also being of any suitable shape. Within this grooved packing is located a second packing which is adapted to move at a different angle from the first-mentioned packing and in a different direction therefrom, said packings being provided with springs or other suitable means for forcing them outward in different directions, and also for maintaining them in yielding frictional contact with their contacting surfaces.

The invention is adapted to be applied to the reciprocating pistons of steam engines as well as to rotary pistons.

Referring to the drawings, Figure 1 is a side view in elevation of a standard type of rotary engine having one of the sides of the cylinder removed, and showing the invention as applied to its piston. Fig. 2 is a vertical cross section on the line x—x of Fig. 1, showing the entire cylinder in position. Fig. 3 is an enlarged side view of a packing ring constructed in accordance with this invention, with its retaining or follower ring removed. Fig. 4 is a cross section of the packing ring in Fig. 3, on the line y—y, showing the retaining or follower ring in position. Fig. 5 is an enlarged detail view in section of a part of the cylinder in Fig. 2, showing the manner of securing the retaining or follower ring to the packing. Fig. 6 is a view in vertical section of a reciprocating piston provided with a packing constructed and arranged according to this invention. Fig. 7 is an end view of the piston in Fig. 6, with the retaining plate removed. Fig. 8 is an enlarged detail sectional view showing one of the springs connected with the inner packing ring. Fig. 9 is a modification of a portion of the main packing ring showing the second packing ring formed in sections. Fig. 10 is another modification showing a portion of the main packing ring formed with two grooves and showing two second packing rings formed in sections. Fig. 11 is an enlarged detail sectional view, showing the rings in Fig. 10 in cross section, mounted in a piston, and showing one of the springs yieldingly supporting the entire packing ring. Fig. 12 is a detail view in longitudinal section of the main packing formed with a straight groove and the second packing spring supported. Fig. 13 is a detail view in cross section on the line z—z of Fig. 12.

Referring to Figs. 1 to 5 inclusive, in Fig. 1 is shown a standard type of rotary engine 1, having one of the sides of its cylinder removed, and provided with a rotary piston 2 mounted on a shaft 3 in a cylinder 4. The faces of the piston 2 are formed with circumferential grooves 5 located adjacent to the periphery of the piston and having its open side contiguous to the wall or facing of the cylinder 4. Located in said groove 5 is a packing, which in this form of the invention, consists of a suitably shaped main ring 6, and as here shown of an L-shape. Secured to said ring 6, in any suitable manner, as for example by screws 7, as shown in Fig. 5, is a flat cylindrical ring 8 which serves as a retaining plate and also serves to form a groove 9 in which is located a second main packing ring 10. The packing rings 6 and 10 may be of any suitable material, and preferably are of metal. The packing ring 10 as more fully shown in Fig. 3, is a split ring and gradually narrows from a point between its ends to its ends as shown in Fig. 3. The packing ring 10 may be sprung into the groove 9 between the L-shaped packing ring 6 and the cylindrical flat ring 8. The packing ring 10 by its elasticity bears outwardly and yieldingly against the outer peripheral face of the groove 5. In order to press the entire packing, thus far described, yieldingly against the inner face of the cylinder 4, suitable springs, such as 11, spaced apart, are mounted in sockets 12 in the piston 2 and bear against the cylindrical ring 8. It will thus be seen that by means of this construction, a packing joint is provided in one or both faces of the piston, as may be desired, which has a yielding frictional contact surface movable to and away from the inner face of the cylinder 4 and an independent yielding frictional contact surface movable to and away from the outer circumferential surface of the groove 5. By means of this joint not only is a tight joint afforded between the faces of the piston and the inner walls of the cylinder and leakage thereby prevented, but also a tight joint is afforded between the packing and the sides of the groove in which said packing is located. It will readily be seen that any chance for the steam to enter or leak into the groove between the side of the groove and the packing and then to pass circumferentially along in the groove and enter into the cylinder on the opposite side of the dividing line of said cylinder is prevented. By means of this construction also, the parts may be readily removed and replaced when broken or worn.

Referring to Figs. 6, 7 and 8, the invention is shown as applied to a reciprocating piston 13, located in a cylinder 14. The piston 13 is formed with a circumferential groove 15, here shown of a right angular shape, so that two open sides of the groove are presented to the frictional contacting surface, namely, one to the inner surface of the cylinder 14 and the other to the inner surface of a retaining plate 16 secured to the piston 13 in any suitable manner, as for example by a nut 17 engaging the threaded projecting end of a piston rod 18 extending through the piston 13. Located in the groove 15, is a U-shaped packing ring 19 which is preferably formed in sections 20, and which is held outwardly in yielding frictional contact with the inner surface of the cylinder 14 by means of suitable springs 21 mounted on the sections 20 and bearing against the piston 13. Within the U-shaped main ring 19, is located a second packing ring 22 which is provided with a series of sockets 23 and in which are located springs 24 abutting against the inner face of the grooved ring 19 and pressing the outer surface 25 of the ring 22 against the inner contacting frictional surface of the retaining plate 16. It will be seen that, by means of this construction, the main packing ring 19 is held in yielding frictional contact with the inner surface of the cylinder 14 and the second packing ring 22 is held in yielding frictional contact with the inner surface of the retaining plate 16, thereby providing a packing which is made up of packing rings independently movable in different directions from each other, and at different angles and having frictional contacting surfaces abutting against the inner surface of the cylinder and against the retaining plate on the piston. By this means, not only is a tight joint provided for the contacting peripheral surface of the piston with the inner surface of the cylinder, but also a tight joint is provided between the packing and the wall of the groove containing the main packing.

The modification shown in Fig. 9, is a portion of a main packing ring 26 formed of an L-shape and having a second packing ring 27 formed in sections, said sections being held outwardly against the frictional contacting surface by means of suitable springs, such as 28, located in the groove 29 formed between the main packing ring 26 and the second packing ring 27.

In Figs. 10 and 11 is shown another modification of the packing which consists of a main packing ring 30 formed with two grooves 31 by means of the double second rings 32 and 33 which are preferably formed in sections. The sections of the outer ring 32 are held in yielding frictional contact with the adjacent surface of the groove by means of a number of springs 34, and the inner second ring 33 is held away from a ridge or tongue 35 of the main packing ring 30 by means of suitable springs 36. By means of this construction, the packing being placed in the circumferential groove 37 in the face of a piston 38 as shown in Fig. 11 and the main packing ring and the two second packing rings being held together by means of a retaining circular ring 39 secured to the packing ring 30 by screws 40, the packing is held in yielding frictional contact with the adjacent surface of the inner wall of a cylinder by means of a number of springs 41 located in sockets 42 in the piston 38, and bears against a retaining circumferential ring 39.

In Figs. 12 and 13 are shown portions of a packing strip constructed in accordance with this invention, in which a main strip 43 is of a U-shape and formed with a straight groove 44 in which are mounted a series of suitable springs 45 which bear against and are adapted to hold a second packing strip 46 against an adjacent frictional contacting surface. It will be understood that in this latter construction the main packing strip 43, when located in a groove of a member in which the packing is mounted, will be yieldingly pressed in frictional contact by suitable springs as in Fig. 2, in one direction, while a second packing strip 46 will be pressed in frictional contact by springs 45 in another direction. In this case the packing is applied to a straight joint instead of to a circumferential joint.

By means of this invention compensation is had for unevenness of wear in the packing ring of reciprocating engines and avoids the necessity of returning the ring to the lathe to be re-ground.

I claim:—

1. A fluid pressure packing joint consisting of a member formed with a groove, and a packing in said groove composed of packing members expansible in different directions to each other, each of the members in said groove having its own means for expanding it independently of steam pressure or the expansion of another member.

2. A fluid pressure packing joint consisting of a member formed with a groove, and a packing in said groove composed of packing members independently expansible in different directions to each other without being affected by steam pressure.

3. A fluid pressure packing joint consisting of a member formed with a groove, and a packing composed of members located one within the other and expansible in different directions to each other, each of the members in said groove having its own means for expanding it independently of steam pressure or the expansion of another member.

4. A fluid pressure packing joint consisting of a member formed with a groove, and a packing in said groove composed of an angular grooved member, an expansible member located in said grooved member, and resilient means for independently expanding said members in different directions to each other.

5. A fluid pressure packing joint consisting of a member formed with a groove, and a packing in said groove having a retaining ring secured to said packing and forming a groove, an expansible member located in said groove, and resilient means for independently expanding said members in different directions from each other.

6. A fluid pressure packing consisting of an L-shape packing strip, a strip secured thereto and forming a groove therewith, an expansible packing strip located in said groove, and resilient means for expanding said packing strips independently of each other in different directions.

7. A fluid pressure packing joint consisting of a movable cylindrical member provided with a circumferential groove in its side face adjacent to a stationary frictional member, a packing ring located in said groove and consisting of a circumferential member expansible against an adjacent frictional surface, and a second circumferential member mounted in said first member and expansible at right angles thereto, each of the members in said groove having its own means for expanding it independently of steam pressure or the expansion of another member.

8. A fluid pressure packing joint consisting of a member provided with a groove, a grooved packing member located in said groove and a second packing member located in said grooved packing member, resilient means for expanding the first member outward from said groove and independent resilient means for expanding the second member against the side of the first named groove.

9. A fluid pressure packing joint consisting of a piston provided with a circumferential groove in its face adjacent to its periphery, a grooved packing ring located in said groove, an expansible packing ring located in said grooved packing ring, and springs for expanding the entire packing laterally in the main groove, the expansible packing ring being movable at right angles to the movement of the main packing ring.

10. A fluid pressure packing joint consisting of a piston formed with a circumferential groove in its side face adjacent to its periphery, a grooved packing ring located in said groove, springs for expanding said grooved packing ring outward from said groove, and a split expansible packing ring located in said grooved packing ring and bearing against the side of the main groove.

In testimony whereof I have affixed my signature, in presence of two witnesses.

JOHN F. HENDRICKSON.

Witnesses:
   DUANE T. PERKINS,
   ARTHUR DRINKWATER.